J. B. WEST.
COMBINATION PLANTER AND FERTILIZER DISTRIBUTER.
APPLICATION FILED APR. 17, 1908.
905,395.
Patented Dec. 1, 1908.
3 SHEETS—SHEET 1.
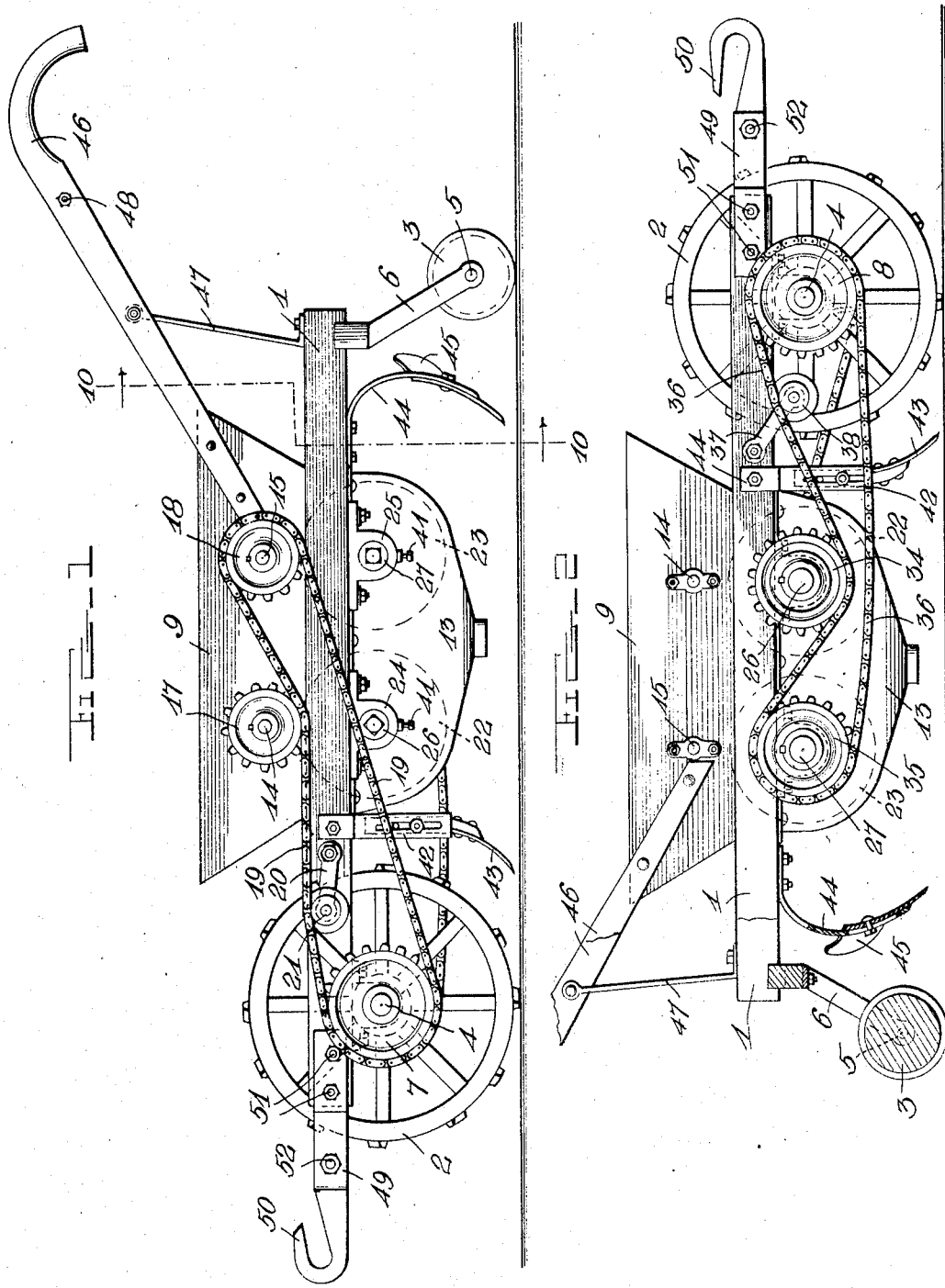

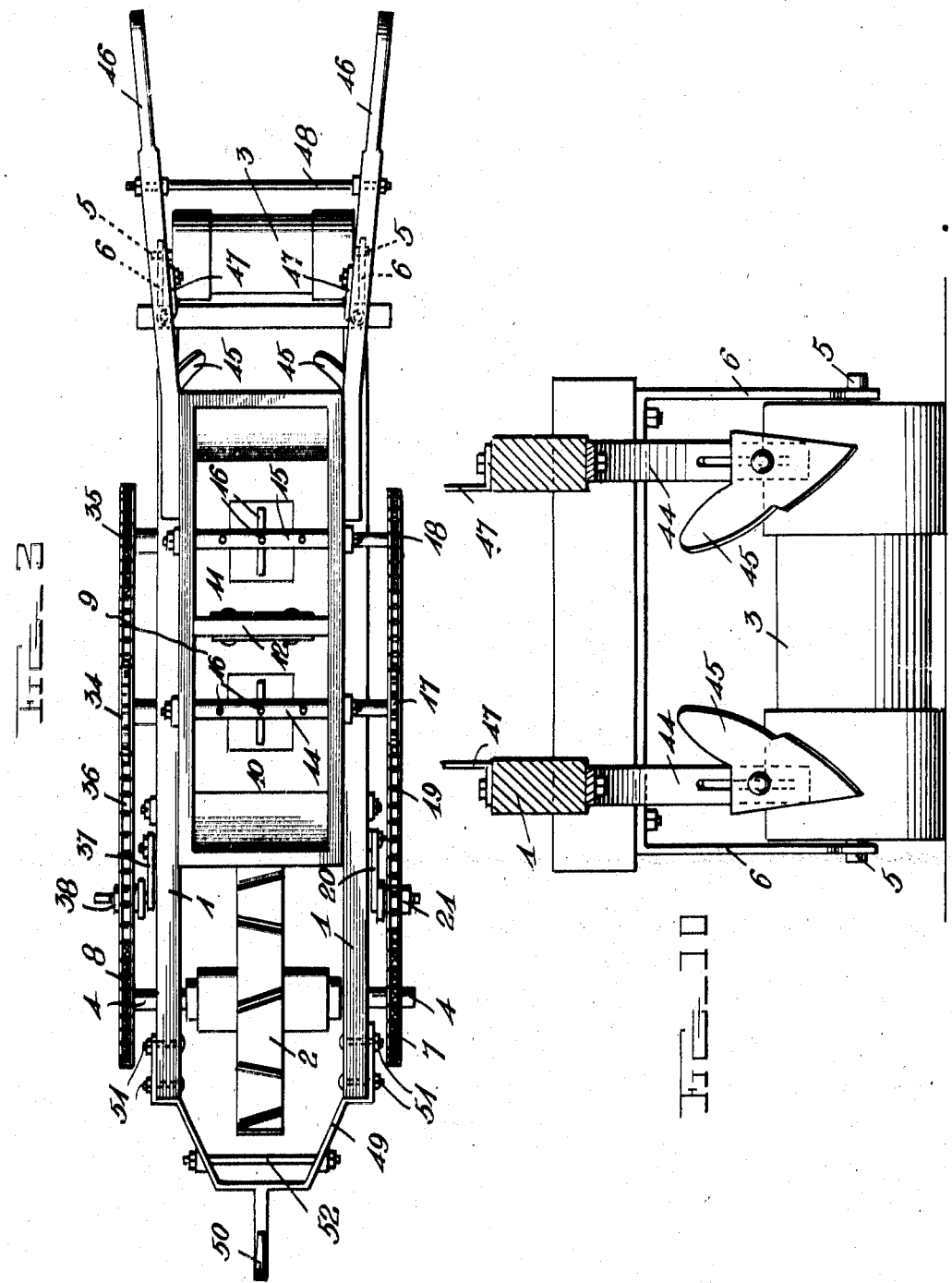

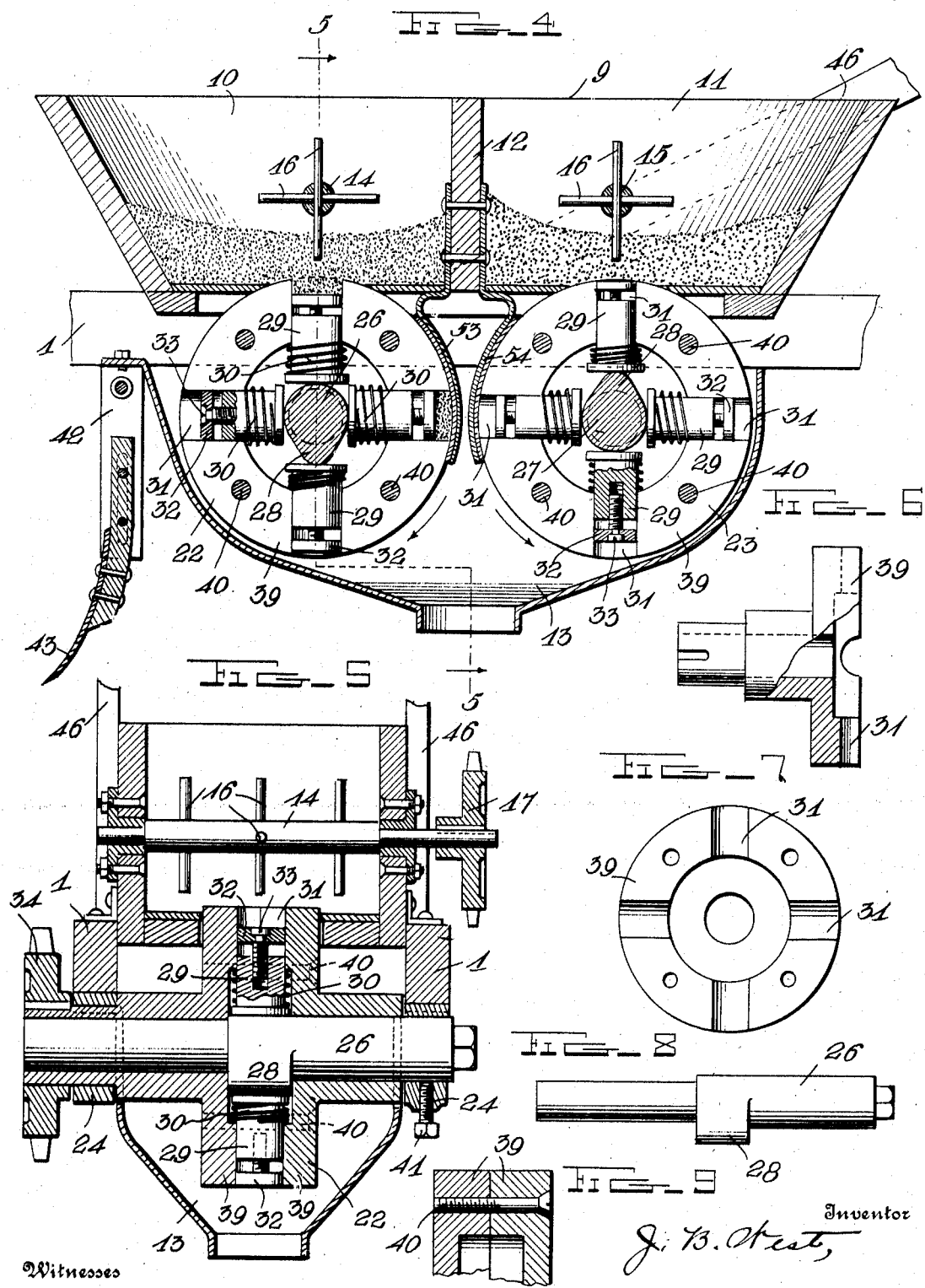

UNITED STATES PATENT OFFICE.

JUNIUS B. WEST, OF BARTON, ARKANSAS.

COMBINATION PLANTER AND FERTILIZER-DISTRIBUTER.

No. 905,395.　　　　Specification of Letters Patent.　　　　Patented Dec. 1, 1908.

Application filed April 17, 1908. Serial No. 427,710.

*To all whom it may concern:*

Be it known that I, JUNIUS B. WEST, a citizen of the United States, residing at Barton, in the county of Phillips and State of Arkansas, have invented certain new and useful Improvements in Combination Planters and Fertilizer-Distributers, of which the following is a specification.

This invention relates to new and useful improvements in cotton, corn, and seed planters, together with fertilizer distributers, reference being had to the accompanying drawings, which form a part of the following specification, like numerals designating, like parts, throughout the several views.

The object of my invention is to produce a farming implement that will be commercially cheap, of the greatest possible utility to farmers, enabling them to plant their seed scientifically, so as to produce the largest and strongest crops; enabling them to do away with wasteful methods, which, in the long run are disastrous.

A further object of my invention is to produce a seed planter, which will drop any number of seeds at any distance apart, and also place the fertilizer in the proper amount at just the right spot to save the waste of indiscriminately distributing the fertilizer throughout the field.

Further it is pointed out that my machine may be simply and easily adjusted so that it will be adapted to necessary conditions.

While my improved planter is especially adapted to the planting of cotton seed, it can be made equally valuable in planting corn, peas, peanuts, or the like.

With these and other objects in view, my invention relates to the particular construction and combination of parts as are described in the following specification, illustrated in the accompanying drawings, and particularly pointed out in the claims hereunto appended.

Reference being had to the drawings:—
Figure 1, is a side elevation of my device. Fig. 2, is a similar view showing the opposite side thereof, partly in section. Fig. 3, is a top plan view of my invention. Fig. 4, is a central, vertical, longitudinal, sectional view, of my seeder, on an enlarged scale, through the feeding chamber, one of the seed feeding wheels, being shown out of operation. Fig. 5, is a vertical, sectional view of Fig. 4, on the line 5—5, looking rearwardly. Fig. 6, is a detail side elevation, partly in section of one member of the seed feeding wheels. Fig. 7, is an inner face view of Fig. 6. Fig. 8, is a detail, side elevation of one of the feed roller supporting axles. Fig. 9, is a fractional detail section of one of the seed feeding wheels. Fig. 10, is a vertical, sectional view, taken on the line 10—10 of Fig. 1.

Referring more particularly to the drawings, the longitudinal beams 1, are supported at their front ends by the wheel 2, and at their rear ends by the roller 3, said wheel being mounted on the spindle 4, said roller on the spindle 5, passing through perforations at the lower ends of the downwardly projecting arms 6. The sprocket wheels 7 and 8, are securely mounted on the ends of said spindle 4, outside of the longitudinal beams. The hopper 9, which is divided into compartments 10 and 11, by means of the partition 12, is secured to said longitudinal beams. The mixer receptacle 13, is secured to the under faces of the longitudinal beams 1, by screws or bolts, or by any other suitable fastening means. Running through the said compartments 10 and 11, are spindles 14 and 15, having mixing arms 16 extending radially therefrom. The sprocket wheels 17 and 18, are keyed to the outer extending ends of said spindles 14 and 15, respectively, for the purpose of actuating the mixing arms of said spindles. The sprocket wheels 17 and 18, are rotated by means of the chain 19, which is held taut by means of the adjustable arm or idler 20, having journaled on its outer end a roller 21, said roller bearing upwardly against the under surface of said chain. The feed rollers 22 and 23, are mounted by means of the bearing 24 and 25, respectively, on the under face of the longitudinal beams, arranged on the inside of said mixer 13. The spindles 26 and 27, upon which said feed rollers rotate have formed at their central portion cams 28, for the purpose of operating the plugs 29, which are held against the surfaces of said spindles by means of springs 30. The cam is so arranged that it projects downwardly, thus, when the plugs are extending upwardly in the chambers 31, a sufficient space is left in said chambers to permit of a specific amount of seed or fertilizer to fall therein. When the said feed rollers revolve a sufficient distance, so that a chamber which is partially filled with seed or fertilizer, assumes a position so that the contents of said chamber will be caused to empty therefrom by the force of gravity, the said plug of that particular chamber will be forced outwardly causing every particle of matter in said chamber to be emptied therefrom into the mixer 13.

Each plug is provided with a cap 32, which has passing through its center a screw 33, said screw adapted, and for the purpose of regulating the position of the cap 32, thus, aiding said cap in regulating the amount of fertilizer or seed that will be allowed to fall in each of the said chambers 31.

Mounted on one end of the outwardly projecting ends of the shafts of the feed rollers 22 and 23, are the sprocket wheels 34 and 35, for the purpose of revolving said feed rollers. Said sprocket wheels 34 and 35, are rotated by means of the chain 36, which in turn is caused to travel by means of the sprocket wheel 8, said chain being held taut by means of the adjustable arm or idler 37, having journaled at its lower end a roller 38.

The feed rollers 22 and 23, are composed of two similar, corresponding members 39, which are held together by means of screws 40, or any other substantial or well known fastening means. The spindles upon which the feed rollers rotate are held firmly in position by means of the set screw 41.

Adjustably secured to the plow standard 42, is the furrow opener 43; secured to the plow standards 44, and arranged thereon in an adjustable manner, are the covering blades 45. Running rearwardly upward, and secured to the hopper 9, are the handles 46, said handles being held substantially in position by means of braces 47, and further held securely together by means of the bracing cross bar 48.

Formed integral with the draft braces 49, is the draft hook 50, said draft braces secured to the forward ends of said longitudinal beams by means of nuts and bolts 51, said braces being further strengthened by means of the cross bar 52.

It is observed that by changing the size of the sprocket wheels, 7 and 8, mounted on the ends of spindle 4, the numbers of revolutions of the spindles 14 and 15, together with the frequency of the revolutions of the feed rollers 22 and 23, may be regulated.

The strips 53 and 54, which are secured at their upper portions to the partition 12, are so shaped as to conform themselves to the curvature of the periphery of said feed rollers. These strips are adapted and for the purpose of preventing particles of seed or fertilizer from falling from said seed chambers 31, until the said chambers have passed the lower edge of said strips.

Though I have specifically described my invention, I may claim the right to make such alterations and modifications in its general form and construction as will not depart from the spirit of my claims, and will substantially fall within the scope of my invention.

I claim—

1. In a seeder and fertilizer distributer of the class described, the combination of a hopper having two adjoining compartments, said hopper mounted on longitudinal beams, a mixer receptacle secured to the faces of said beams, means provided in said mixer receptacle to measure out a specific quantity of seed and fertilizer, said means consisting of seed rollers, each roller comprising two adjacent corresponding members, having cut therein corresponding recesses, forming in conjunction with each other, seed chambers, the corresponding members of each seed roller having a series of corresponding perforations passing therethrough, screws, one passing through each two corresponding perforations, to hold said corresponding sections firmly together, each seed chamber is provided with a plug adapted to be forced therein by means of a cam spindle, said seed roller coacting with the mixer receptacle to form a mixture of seed and fertilizer before the same is conducted into a furrow.

2. In a device of the character described, the combination of a hopper, divided into adjacent compartments, mounted on longitudinal beams, with a mixer receptacle secured to the under face of said beams, said mixer receptacle having feed rollers rotatably mounted therein, by means of spindles, said rollers consisting of two adjacent corresponding members, provided with corresponding recesses, forming, in conjunction with each other, seed chambers, said chambers each provided with a spring actuated plug, each plug held, by means of said spring, against the outer surface of one of said cam spindles, each of said plugs provided with a screw regulated cap, said caps for the purpose of gaging the amount of seed or fertilizer allowed to enter said seed chambers, the cam of said spindle adapted and for the purpose of forcing said plugs into said seed chambers, against the action of said springs, thus forcing the contents of said chambers into said mixer receptacle, one of said feed rollers provided for each compartment of said hopper, substantially as shown and described.

3. In a device of the character described the combination of a hopper, divided into adjacent compartments, a mixer receptacle, and means for the support of said hopper and mixer receptacle, with two seed rollers of specifically constructed form, mounted in said mixer receptacle by means of spindles, each of said feed rollers provided for a separate compartment of said hopper, said rollers consisting of two adjacent corresponding members, held together by any substantial means, said members having corresponding recesses cut in their inner faces forming seed chambers in conjunction with each other, each of said seed chambers provided with a spring actuated plug, each provided with a screw actuated cap, said caps adapted and for the purpose of being adjusted to gage the amount of seed or fertilizer that shall fall into said seed chambers, the cams of said spindles, which project downwardly, provided for the purpose of forcing said plugs outwardly, against the action of their particular spring, into said seed chambers, thus emptying the contents of said chambers into said mixer receptacle, strips secured to the partition of said hopper, adapted and for the purpose of preventing the seed or fertilizer from falling from said seed chambers, until the plug of each particular seed chamber shall arrive at such a point as to come into contact with said cam of said spindle.

4. In a device of the character described a cam spindle having one portion thereof of greater diameter than its other portion, said spindle adapted to be thrown out of its normal position, and further adapted to be engaged by means of a set screw to hold it in a certain position desired.

5. In a seeder and fertilizer distributer of the class described, a mixer receptacle having mounted therein two seed chambers, each of which consists of two adjacent members, having corresponding recesses, which form in conjunction with each other seed chambers, further provided with corresponding, registering perforations adapted for the reception of screws, one of said sections of each feed roller having an outwardly projecting end whereon is mounted a sprocket wheel for the rotation of its feed roller.

In testimony whereof I affix my signature, in presence of two witnesses.

J. B. WEST.

Witnesses:
J. D. MONTGOMERY,
I. P. EVANS.